United States Patent Office 3,481,467
Patented Dec. 2, 1969

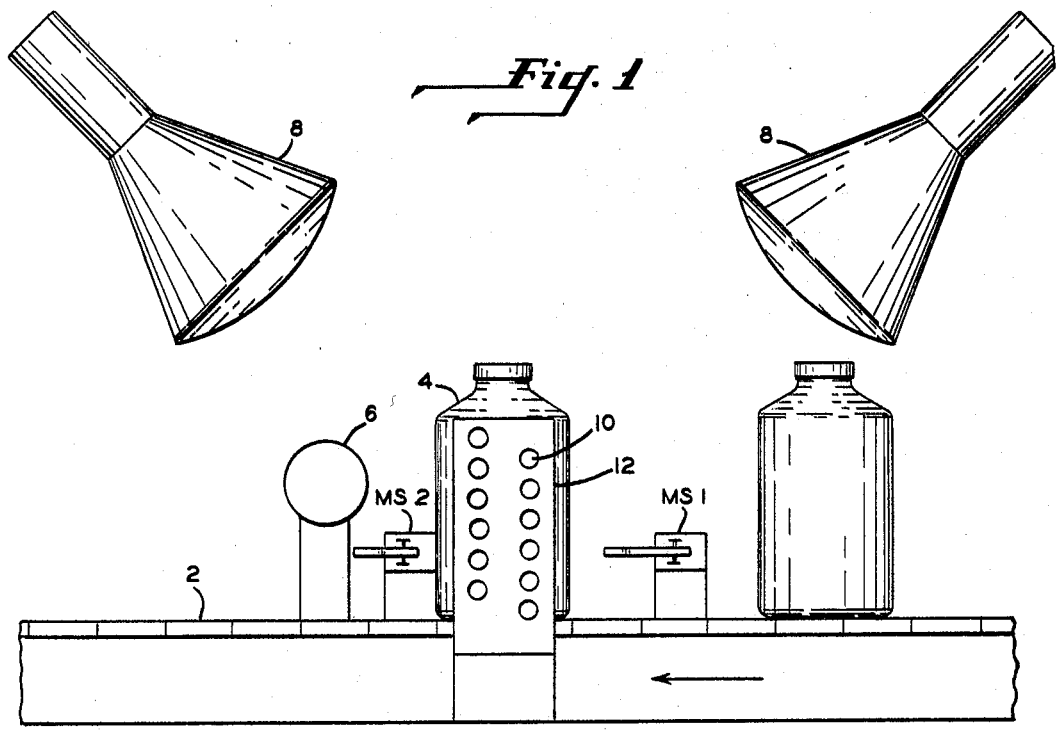
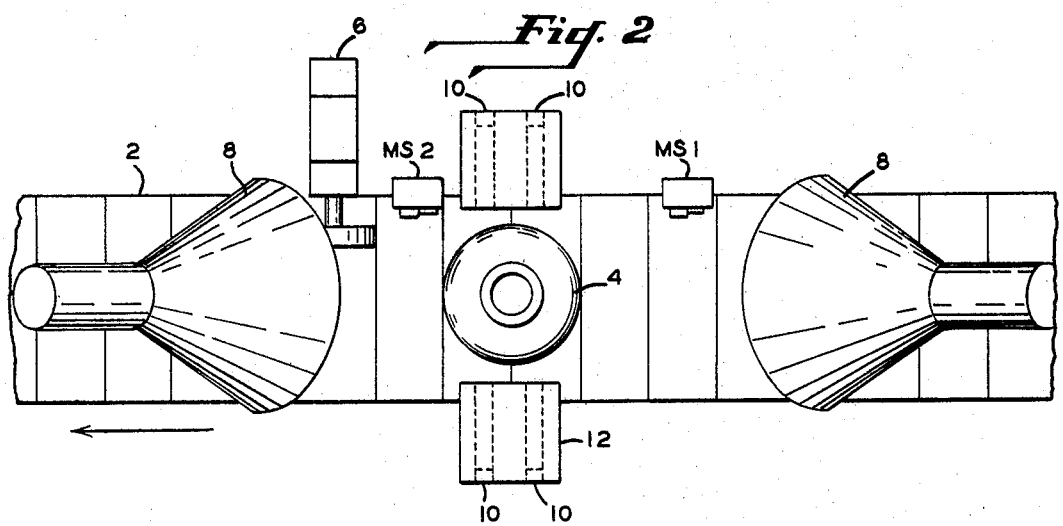

3,481,467
PHOTOCELL INSPECTION DEVICE FOR GLASSWARE
Harry N. Wood, Millville, N.J., assignor to Armstrong Cork Company, Lancaster, Pa., a corporation of Pennsylvania
Filed Mar. 31, 1967, Ser. No. 627,504
Int. Cl. B07c 5/342; G01n 21/46; H01j 39/12
U.S. Cl. 209—111.7     1 Claim

ABSTRACT OF THE DISCLOSURE

Apparatus and method for inspecting narrow-mouth or wide-mouth glassware for defects common to this type of glassware. Plural photocells are positioned on either side of the glassware to be inspected and light is passed through the center of the barrel of the glassware. Defects in the glassware will cause reflection or refraction of the light and a resulting increase or decrease in the electron flow of one or more of the photocells. A sensing circuit detects the change in electron flow so that a reject mechanism may be actuated.

BACKGROUND OF THE INVENTION

Field of the invention

The present invention relates to a method of and apparatus for the detection of defects in glassware. More particularly, this invention is concerned with the detection of birdswings, stones, blisters, blank-tears, or checks in glassware by sensing any deviation in the optical transmission characteristics of the glassware caused by the above defects.

DESCRIPTION OF THE PRIOR ART

Mechanical inspection of glassware was normally performed by one of three methods. The glassware would be rotated and scanned by a photocell inspection system as shown in Patent 3,180,994. The glassware may be held stationary and scanned by a movable scanner as shown in Patent 3,292,785. Finally, the glassware could be inspected by having an inspection device inserted into the glassware as shown in Patent 3,098,564. However, the aforementioned mechanical inspection systems were not feasible for or did not function properly for the detection of a birdswing, stone, blister, blank-tear, or check in a narrow-mouth glass container. Presently, the only satisfactory way of inspecting this type of glassware is by the manual inspection technique.

Consequently, this invention will replace the manual inspection technique and provide a reliable mechanical inspection system which will readily detect those defects which formerly could only be dected by the manual inspection system.

SUMMARY OF THE INVENTION

This invention utilizes radiant energy sources which are centered on the axis of the conveyor carrying the glassware so that the rays of the radiant energy sources pass through the center of the barrel of the glassware. A defect of the nature of a birdswing, stone, blister, blank-tear, or check will by reflection and/or refraction cause some of the radiant energy to be directed towards one of the photocells causing an increase in electron flow or away from one of the photocells causing a decrease in electron flow. The photocells are positioned on either side of the conveyor and each photocell scans a particular area with the complete photocell system providing a complete coverage of the barrel of the glassware. The increase or decrease in the electron flow is taken as a signal that a defect exists and this signal is used to actuate structure to reject the glassware.

The invention is particularly useful because it does not interfere with the flow of glassware along the conveyor and has no elaborate glassware handling apparatus which must detain or move the glassware during the inspection operation.

This invention embodies an inspection apparatus that is cheaper, more predictable, and more reliable than the personnel that must be used in the manual inspection technique.

BRIEF DESCRIPTION OF THE DRAWINGS

FIGURE 1 is a side view of the inspection apparatus;
FIGURE 2 is a top view of the apparatus of FIGURE 1.

DESCRIPTION OF THE PREFERRED EMBODIMENT

Figure 3:
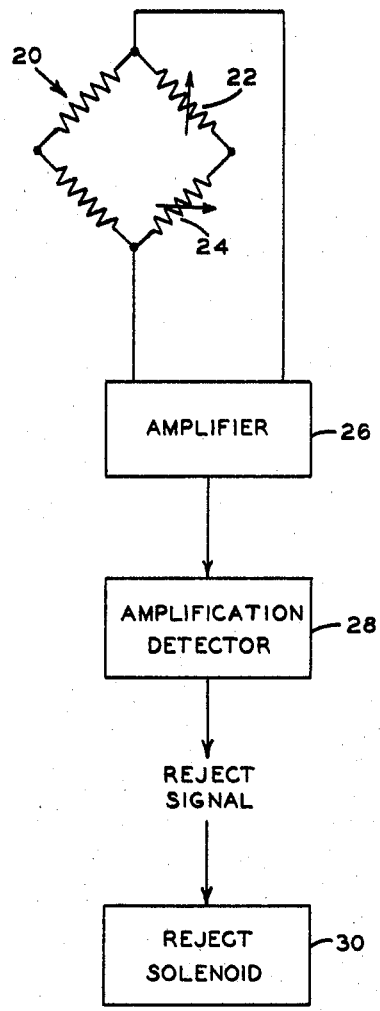
FIGURE 3 is a schematic view of a portion of the control system.

The apparatus of this invention utilizes a conveyor 2 to move the glassware 4 past the inspection station. A microswitch MS-1 is actuated by the glassware to initiate the inspection cycle and a microswitch MS-2 terminates the inspection cycle and permits rejection of the reject glassware by an air cylinder reject apparatus 6 which merely knocks the reject bottle off of the conveyor.

Radiant energy sources 8 are centered on the axis of the conveyor and are directed so that their rays pass through the center of the barrel of the glassware or bottle 4. The actual scanning of the bottle is performed by the photocells 10 mounted on either side of the conveyor. The photocells are positioned in mounting blocks 12 and each cell is recessed deeply in the block to restrict its field of vision. The field of vision of adjacent photocells overlaps so that complete coverage of the barrel body is secured by the composite photocell system. As seen in FIGURE 1, the photocells are arranged in two vertical rows with six photocells per row.

The photocells in each row are in a separate bridge circuit. Alternate photocells are connected in series to form one leg of the bridge circuit. Referring to FIGURE 1, if the uppermost photocell on the right-hand row is considered cell #1 and the last photocell in that vertical row is considered photocell #6, and the cells #1, 3, and 5 would be wired in series and the cells numbered 2, 4, and 6 would be wired in series.

FIGURE 3 shows a schematic of the detection system and its control circuit. A conventional bridge structure 20 would have three series connected photocells of a vertical row in leg 22 of the bridge circuit and the three remaining series connected photocells of the vertical row would be in leg 24 of the bridge circuit. The remaining two legs of the bridge circuit contain balancing resistors to keep the bridge circuit in balance. An acceptable bottle passing through the inspection area will provide some reflection and/or refraction of the rays from the radiant energy sources 8. This reflection or refraction will affect the photocells to a known degree and the response by the photocells is balanced by the other legs of the bridge circuit so that the bridge circuit will provide a known signal.

However, when a defective bottle passes through the inspection device, there will be a reflection and/or refraction of the rays of the radiant energy source above and beyond that normally experienced with an acceptable bottle. This then causes an increase or decrease in the electron flow of one or more of the photocells in the bridge circuit. The unbalanced bridge circuit then generates a signal which is fed to the amplifier 26. The amplified signal feeds then to an amplification detector 28 which has a built-in reference bias. Acceptable glassware passing through the inspection area disturbs the bridge circuit to a slight degree and causes the generation of a signal which would be fed to the amplification detector 28. However, the strength of this signal is readily predetermined in advance and the amplification detector is calibrated so that this signal does not deviate from the reference bias. When a defective bottle is sensed, the incoming signal then deviates substantially from that expected during the inspection of an acceptable bottle. This incoming signal, then differing from the reference bias, causes the generation of a reject signal. The reject signal is fed to the reject solenoid 30 which in turn operates the reject air cylinder 6 to remove the reject bottle from the conveyer line. The particular electric circuitry involved is conventional in the art and well known to those skilled in the art. For example, the utilization of a photocell controlled bridge circuit to generate an inspection signal can be seen in Patent 2,313,218.

The apparatus of this invention is used to detect in narrow-mouth bottles defects such as a birdswing, stone, blister, blank-tear, or check. A birdswing is a bridge of glass extending from one wall of the bottle across the inside of the bottle to the adjacent wall. A stone is a piece of the refractory material which was used in the lining of the glass-making furnace. A blister is a bubble in the wall of the glass. A blank-tear is a groove in the surface of the glass resulting in a thin spot in the glass surface. A check is a small crack in the glassware that does not extend completely through the wall of the glassware. These above defects are readily sensed by the apparatus of this invention. The apparatus herein is particularly useful with narrow-mouth bottles because these bottles will not readily take inserted inspection apparatus. However, this apparatus could be used with wide-mouth bottles and would be more efficient since it eliminates the bottle handling now required with the conventional bottle inspection apparatus.

I claim:
1. A glassware inspection apparatus comprising: means to convey glassware past an inspection area, radiant energy source means positioned along the axis of the conveying means carrying the glassware and passing rays through the center of the barrel of the glassware, a plurality of photocells positioned on either side of the conveying means, said photocells being recessed in mounting blocks which position the photocells on opposite sides of the conveying means and retain the photocells in vertical rows so that the field of vision of the individual photocells overlaps for complete coverage of the barrel of the glassware, alternate photocells in each row being wired in series to form the leg of a bridge circuit and the remaining photocells in a row being wired in series to form a second leg of a bridge circuit so that the photocells are positioned and electrically connected together whereby their electron flow is abnormally varied during the presence of a defective piece of glassware and a reject signal is generated to operate a reject means.

References Cited

UNITED STATES PATENTS

| | | | |
|---|---|---|---|
| 2,415,178 | 2/1947 | Hurley | 250—224 X |
| 2,439,490 | 4/1948 | Schell | 88—14 |
| 2,881,919 | 4/1959 | Bartlett | 250—220 X |
| 2,902,151 | 9/1959 | Miles | 209—111.7 |

M. HENSON WOOD, Jr., Primary Examiner

R. A. SCHACHER, Assistant Examiner

U.S. Cl. X.R.

250—210, 220, 223; 356—240